(12) United States Patent
Lorenz et al.

(10) Patent No.: US 6,293,372 B1
(45) Date of Patent: Sep. 25, 2001

(54) FRICTION DISC WITH INTEGRAL ANTI-RATTLE PORTION FOR ELECTRIC MOTOR BRAKE

(75) Inventors: Dennis Lorenz, Brookfield; Steven F. Chmiel, Cudahy, both of WI (US)

(73) Assignee: Rexnord Corporation, Milwaukee, WI (US)

( * ) Notice: Subject to any disclaimer, the term of this patent is extended or adjusted under 35 U.S.C. 154(b) by 0 days.

(21) Appl. No.: 09/384,360

(22) Filed: Aug. 26, 1999

(51) Int. Cl.[7] ........................................... F16D 65/68
(52) U.S. Cl. ..................... 188/73.35; 188/171; 188/72.3; 74/99 A
(58) Field of Search .................. 188/72.3, 72.7, 188/72.9, 73.35, 73.36, 73.37, 156, 161, 163, 171, 205 A; 192/83, 89.21, 90, 114.22; 390/77, 103; 74/99 A

(56) References Cited

U.S. PATENT DOCUMENTS

| 4,042,077 | 8/1977 | McCarthy . |
| 4,181,201 | 1/1980 | McCarthy . |
| 4,798,269 | 1/1989 | Lindner et al. . |
| 5,186,287 | 2/1993 | Lindner et al. . |
| 5,421,436 | 6/1995 | Lindner et al. . |
| 5,437,351 | 8/1995 | Lindner . |
| 5,620,065 | 4/1997 | Baker et al. . |
| 5,685,398 | 11/1997 | Marshall et al. . |
| 5,697,473 | 12/1997 | Lindner . |

OTHER PUBLICATIONS

Stearns 310 Series Brakes, Stearns Division, Rexnord Corporation, 1998.
Stearns 320 Series Brakes, Stearns Division, Rexnord Corporation, 1997.
Stearns 333 Metric Series Brakes, Stearns Division, Rexnord Corporation, 1998.

*Primary Examiner*—Christopher P. Schwartz
*Assistant Examiner*—C. J. Bartz
(74) *Attorney, Agent, or Firm*—Andrus, Sceales, Starke & Sawall, LLP

(57) ABSTRACT

In an electric motor brake, a friction disc includes an anti-rattle portion integrally molded therewith and reducing the tolerance gap between the motor shaft hub and the friction disc to minimize rattling of the friction disc during rotation of the shaft, and eliminating the need for a separate anti-rattle spring. In a first embodiment, the friction disc has a cavity at the inner circumference thereof facing the hub, and a cantilever finger extending into the cavity and engaging the hub and providing a cantilever bias urging engagement of the hub and friction disc. In a second embodiment, a bump on a slotted inner circumference of the friction disc provides the biasing portion, or may be spaced from the hub by a nominal clearance.

35 Claims, 5 Drawing Sheets

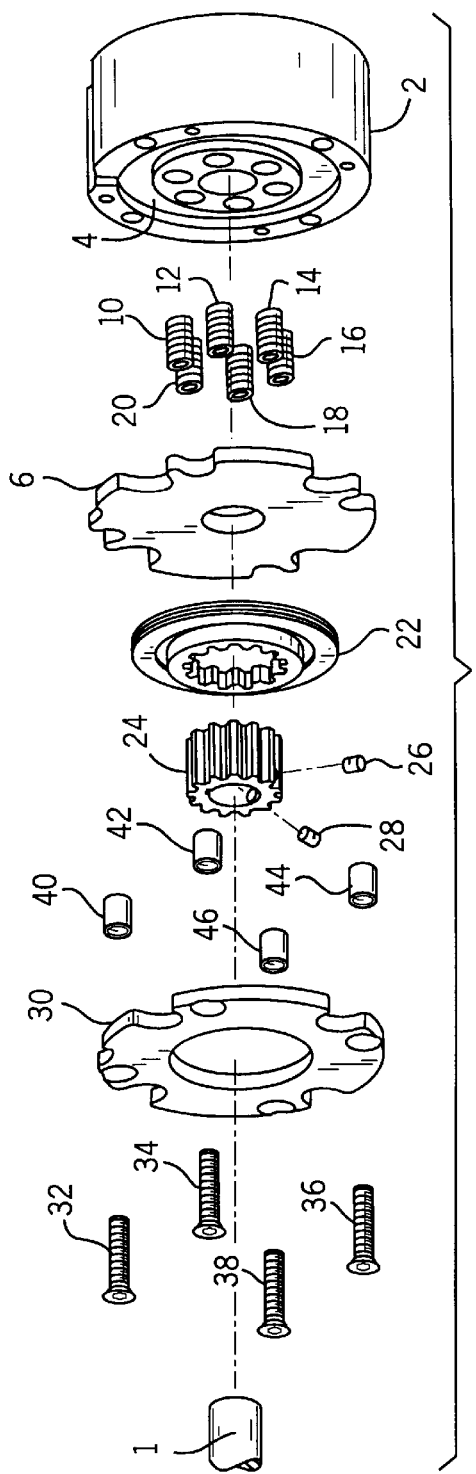
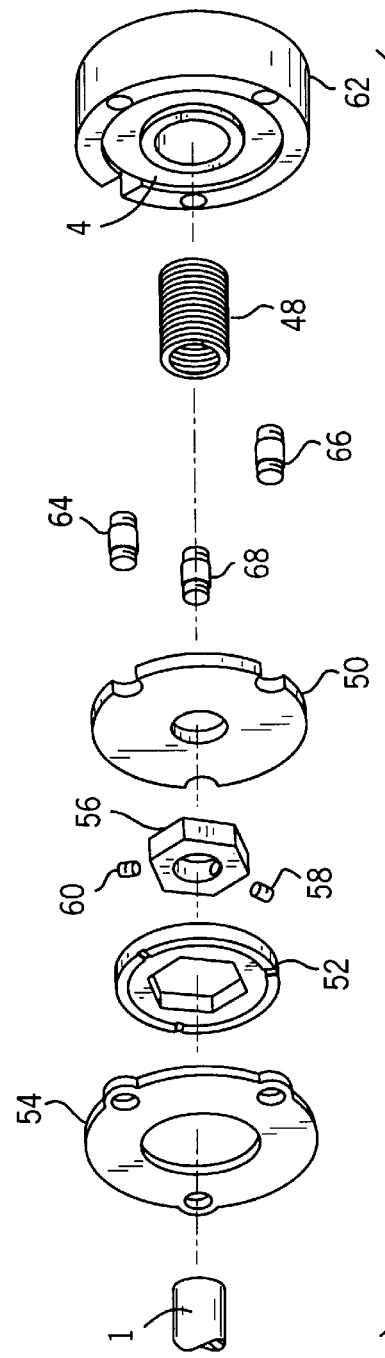
FIG. 3
PRIOR ART
FIG. 4
PRIOR ART

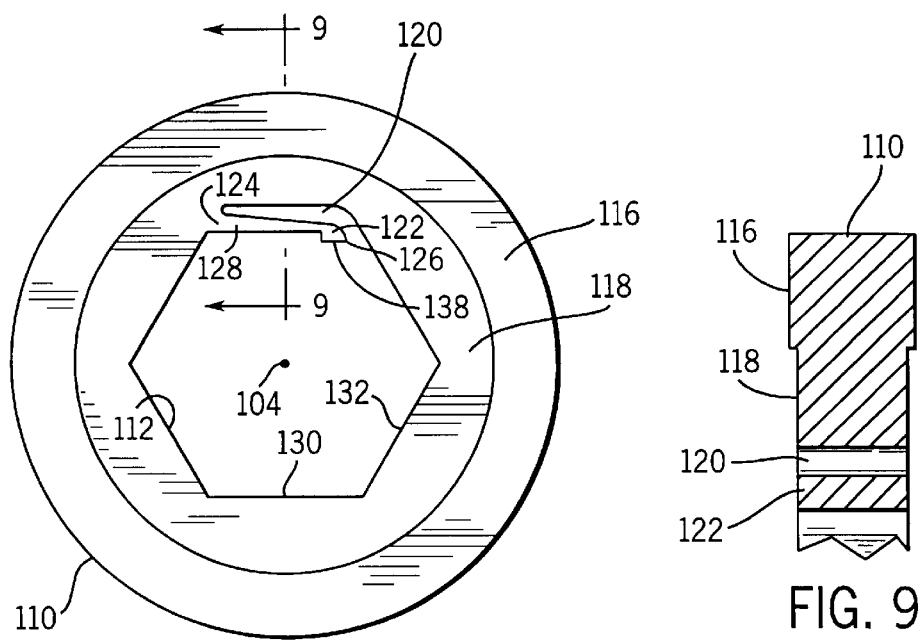
FIG. 8
FIG. 9
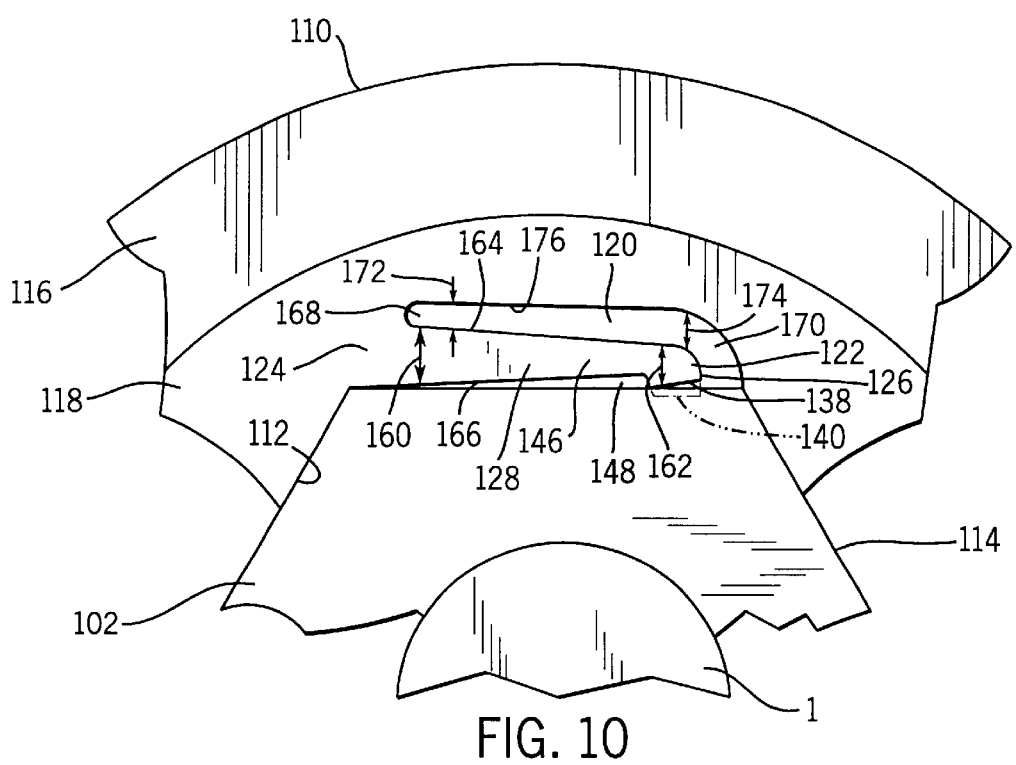
FIG. 10

# FRICTION DISC WITH INTEGRAL ANTI-RATTLE PORTION FOR ELECTRIC MOTOR BRAKE

BACKGROUND AND SUMMARY

The invention relates to brake mechanisms for electric motors and the like, and more particularly to anti-rattle mechanisms for such brakes for reducing rattling of the friction disc during rotation of the motor shaft.

The invention arose during continuing development efforts relating to motor brakes, including those known as solenoid actuated brakes (SAB), and armature actuated brakes (AAB) such as Stearns 310, 320 and 333 series brakes, offered by Stearns Division, Rexnord Corporation, an Invensys Company, and such as shown in U.S. Pat. Nos. 4,042,077, 4,181,201, 4,798,269, 5,186,287, 5,421,436, 5,437,351, 5,620,065, 5,685,398, 5,697,473, incorporated herein by reference.

A brake mechanism for an electric motor selectively stops and permits rotation of the rotary electric motor shaft. The shaft has a hub rotating therewith about the axis of the shaft. A friction disc is mounted on the hub in keyed relation for rotation therewith and is engageable with a pressure plate for stopping rotation of the friction disc, to stop rotation of the hub and shaft.

It is known in the prior art to provide noise-suppressing hub stabilizing springs between the hub and friction disc to apply a slight radial force therebetween to take up backlash and muffle noise by minimizing rattling of the friction disc during rotation of the motor shaft. Examples are as follows: U.S. Pat. No. 4,798,269 at spring 92; U.S. Pat. No. 5,186, 287 at springs 174, 176; U.S. Pat. No. 5,421,436 at spring 142; U.S. Pat. No. 5,437,351 at spring 88; U.S. Pat. No. 5,697,473 at spring 142. Spring loaded ball devices are also known in the prior art.

The present invention provides a simplified anti-rattle mechanism of significantly reduced manufacturing cost. In the present invention, the friction disc includes an anti-rattle portion integrally molded therewith. In a first embodiment, the friction disc has a cavity along its inner circumference facing the hub, and a cantilever finger extending into the cavity and engaging the hub and providing a cantilever bias along a radial biasing direction transverse to the axis of rotation of the motor shaft and which urges engagement of the hub and the friction disc to minimize rattling of the friction disc during rotation of the shaft. In a second embodiment, a bump on a slotted inner circumference of the friction disc provides the biasing portion, or may be spaced from the hub by a nominal clearance. In the first embodiment, the anti-rattle biasing portion flexively applies bias. In one version of the second embodiment, the anti-rattle portion compressively applies bias. In another version of the second embodiment, the anti-rattle portion is spaced from the hub by a nominal clearance, to accommodate tolerance deviations between the hub and the friction disc at opposite ranges of their manufacturing tolerance windows, to allow insertion of the friction disc onto the hub without undue friction interference. In a preferred form of the second embodiment, the hub is provided by a hubbed configuration integrally formed on the motor shaft, eliminating the need for a separate hub member. The hubbed configuration motor shaft may also be provided in the first embodiment. In each embodiment, the friction disc is a one-piece unitary integrally molded member including the anti-rattle portion, eliminating the need for a separate anti-rattle spring.

BRIEF DESCRIPTION OF THE DRAWINGS PRIOR ART

FIG. 1 is a side sectional view of a brake mechanism in the disengaged condition, i.e., power on.

FIG. 3 is an exploded perspective view of the brake mechanism of FIGS. 1 and 2.

FIG. 4 is a view like FIG. 3 but showing another embodiment.

PRESENT INVENTION

Figure 5:
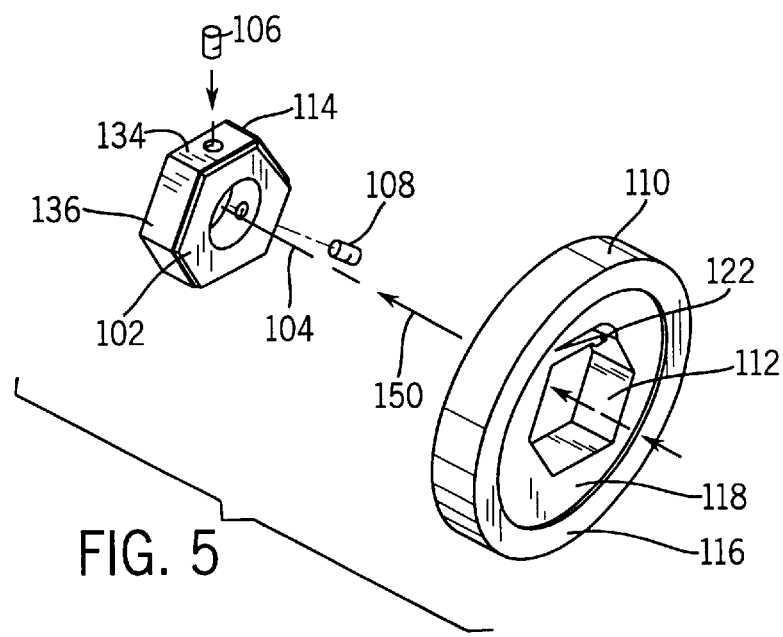

FIG. 5 is a perspective view of a first embodiment of a friction disc in accordance with the invention Separated from a motor shaft hub.

Figures 6, 7:
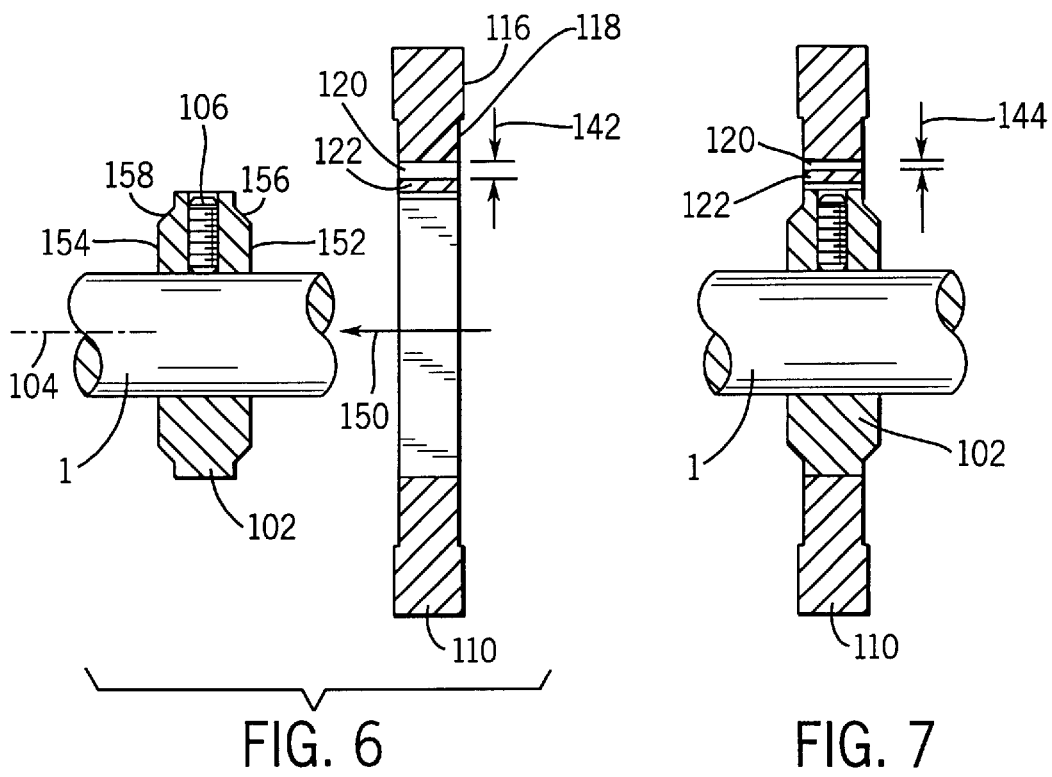

FIG. 6 is a side sectional view of the friction disc and hub of FIG. 5, and also showing a motor shaft FIG. 7 is a side sectional assembly view of the friction disc, hub and motor shaft of FIG. 6.

FIG. 8 is an end elevation view of the friction disc of FIG. 5.

FIG. 9 is a sectional view taken along line 9—9 of FIG. 8.

FIG. 10 is an enlarged fragmentary end view of the friction disc, hub and motor shaft of FIG. 7.

Figure 11:
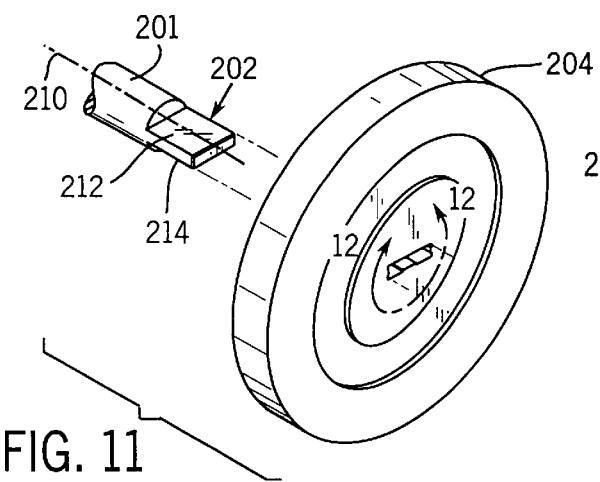

FIG. 11 is perspective view of a second embodiment of a friction disc in accordance with the invention, separated from a motor shaft having a hubbed configuration.

Figure 12:
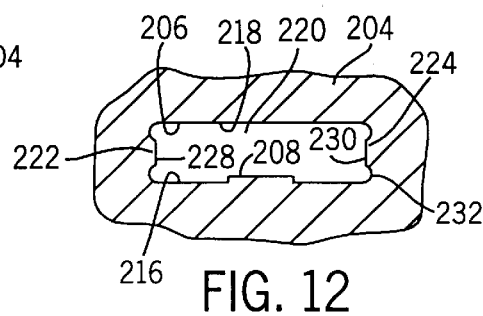

FIG. 12 is a sectional view of a portion of the disc of FIG. 11 as shown at line 12—12.

Figure 13:
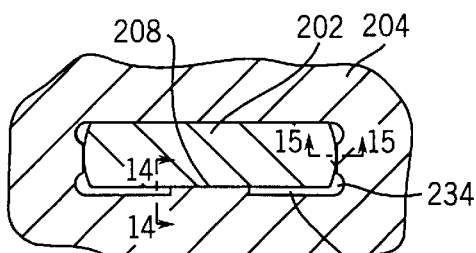

FIG. 13 is an enlarged view like FIG. 12 but showing the disc inserted onto the motor shaft.

Figure 14:
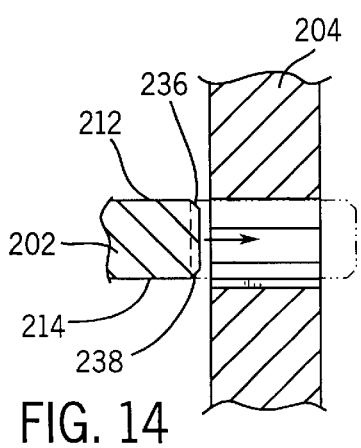

FIG. 14 is a sectional view taken along line 14—14 of FIG. 13, with the motor shaft removed in solid line and inserted in phantom line.

Figure 15:
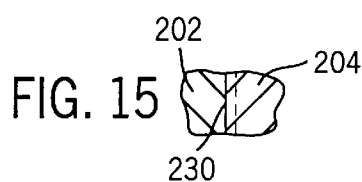

FIG. 15 is a sectional view taken along line 15—15 of FIG. 13.

Figure 16:
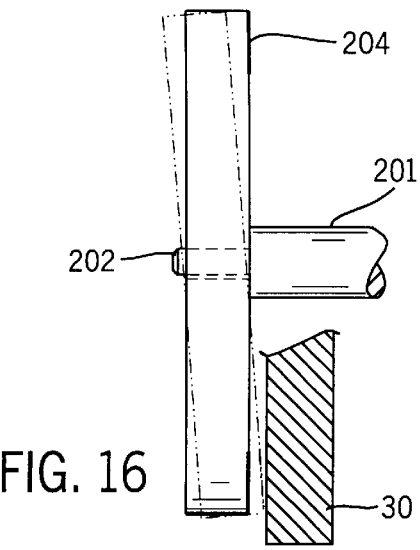

FIG. 16 is a side view schematically illustrating in phantom line one of the types of rattling noise which may occur in the absence of anti-rattle bias.

Figure 17:
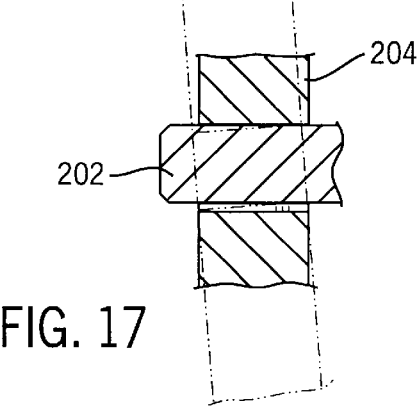

FIG. 17 is an enlarged sectional view of a portion of FIG. 16.

Figure 18:
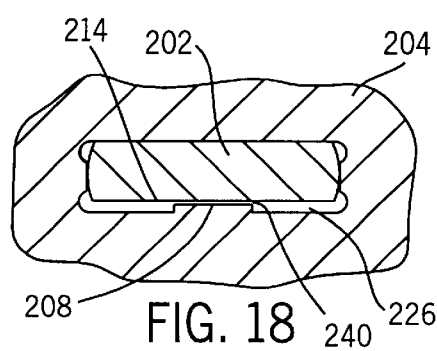

FIG. 18 is a view like FIG. 13 and shows another version of the noted second embodiment.

DETAILED DESCRIPTION PRIOR ART

FIGS. 1–4 are taken from the Series 310, 320, and 333 brake catalogs of Stearns Division, Rexnord Corporation, an Invensys Company, and show an armature actuated brake (AAB).

Figure 1:
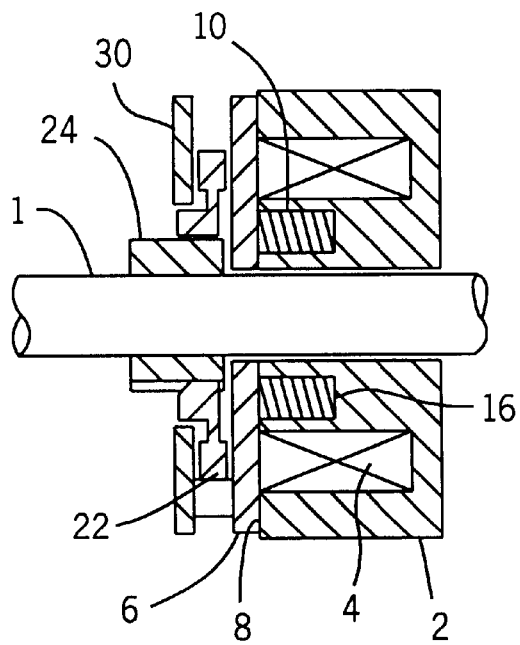
Figure 2:
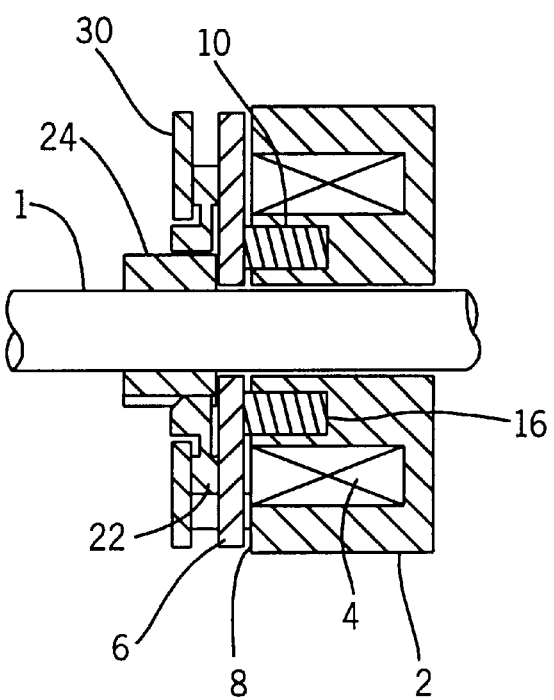
FIG. 2 is a view like FIG. 1 but showing the brake in the engaged condition, i.e., power off.

In FIGS. 1 and 2, magnet body 2 has a coil 4 energizable to attract armature 6 axially rightwardly to close air gap 8, to release the brake. This is shown in FIG. 1, illustrating the disengaged condition, i.e., power on. Armature 6 is pulled rightwardly by the electromagnetic force in magnet body 2, overcoming the bias of compression springs, two of which are shown at 10, 16 in FIGS. 1 and 2, and the remainder of which are shown in FIG. 3 at 12, 14, 18, 20. FIG. 1 shows the brake-disengaged position, i.e., power on, with armature 6 pulled rightwardly into engagement with magnet body 2. This allows friction disc 22 to rotate freely, which in turn allows rotation of hub 24 and electric motor shaft 1. Friction disc 22 is mounted on hub 24 in keyed relation, such as by splines, FIG. 3, or a hex configuration, FIG. 4, etc. Hub 24 is mounted to motor shaft 1 by set screws 26, 28.

Upon de-energization of coil 4, i.e., power off, the electromagnetic force is removed, and compression springs, 10,

12, 14, 16, 18, 20 mechanically force armature 6 axially leftwardly to clamp friction disc 22 between armature 6 and pressure plate 30, stopping rotation of friction disc 22, to stop rotation of hub 24 and motor shaft 1. Pressure plate 30 is stationarily mounted to magnet body 2 by screws 32, 34, 36, 38, and axially spaced therefrom by spacers 40, 42, 44, 46, to set the axial width of air gap 8, FIG. 2. Magnet body 2, with pressure plate 30 mounted thereto as described, is mounted to the end face of the electric motor (not shown), all as is standard in the art.

FIG. 4 is similar to FIG. 3 and shows another embodiment of an armature actuated brake, AAB. The multiple biasing springs 10, 12, 14, 16, 18, 20 of FIG. 3 are replaced by a single central coaxial biasing spring 48 biasing armature 50 axially leftwardly to clamp friction disc 52 against stationary pressure plate 54 for stopping rotation of friction disc 52, to stop rotation of hub 56 and motor shaft 1, FIG. 2. Friction disc 52 is mounted on hub 56 in keyed relation, such as a hexagonal configuration, for rotation therewith. Hub 56 is mounted to motor shaft 1 by set screws 58 and 60. Pressure plate 54 is mounted to and spaced from magnet body 62 by spacers 64, 66, 68, to set the noted air gap. Spacers 64, 66, 68 have knurled right and left ends. The right ends are pressed into magnet body 62. Friction disc 52 is set into position, and then pressure plate 54 is mounted by pressing it onto the left knurled ends of spacers 64, 66, 68. Upon energization of the coil (not shown) in magnet body 62, the electromagnetic force attracts armature 50 axially rightwardly against magnet body 62 overcoming the bias of spring 48 and closing the noted magnetic air gap, to release the brake and permit rotation of friction disc 52, hub 56 and motor shaft 1.

PRESENT INVENTION

FIGS. 5–10 illustrate a first embodiment of the present invention for a brake mechanism selectively stopping and permitting rotation of electric motor shaft 1. The shaft has a hub 102 rotating therewith about the axis 104 of the shaft. The hub is mounted to the shaft by set screws 106,108. Friction disc 110 is mounted on hub 102 in keyed relation for rotation therewith and is axially slidable therealong and engageable with pressure plate 30, FIG. 3, or pressure plate 54, FIG. 4. In the disclosed embodiment, friction disc 110 is mounted on hub 102 in keyed relation by a hexagonal inner circumference 112 of the friction disc mating with a complemental hexagonal outer circumference 114 of the hub. Other keyed mounting relations may be used, as above.

Friction disc 110 is an integral molded member preferably of thermoplastic material, such as polyphenylene sulfide or polycarbonate. Friction disc 110 has an outer border 116 of greater axial width than inner border 118. Alternatively, the friction disc may have a constant axial width. Friction disc 110 has a cavity 120, FIG. 8, at inner circumference 112 facing hub 102, and has a cantilever finger 122 integrally molded with the disc and extending into the cavity and engaging hub 102, FIG. 10, and providing a cantilever bias along a radial biasing direction transverse to the axis of rotation 104 of shaft 1 and which urges engagement of hub 102 and friction disc 110 to minimize rattling of the friction disc on the hub during rotation of shaft 1. The friction disc is a one-piece unitary integrally molded member including biasing portion 122, eliminating the need for a separate anti-rattle spring.

Cantilever finger 122 extends from a root end 124, FIGS. 8 and 10, along a generally circumferential direction of inner circumference 112 to a free end 126. Cantilever finger 122 has an intermediate section 128 between root end 124 and free end 126. Intermediate section 128 is tangent to an arc having a center at the noted axis of rotation 104 of shaft 1. Inner circumference 112 of the friction disc has a plurality of flat engagement surfaces such as 130, 132, etc. mating with flat surfaces such as 134, 136, etc. on hub 102.

Free end 126 of cantilever finger 122 has a projected fingertip 138 projecting inwardly toward and engaging hub 102, FIG. 10, to deflect cantilever finger 122 away from the hub, increasing and focusing application of the noted bias at projected fingertip 138 to further minimize rattling. The non-deflected position of fingertip 138 of cantilever finger 122 prior to insertion on hub 102 is shown at dashed line 140 in FIG. 10, and is also illustrated in FIG. 6. After insertion of friction disc 110 onto hub 102, the radial width or gap of cavity 120 at free end 126 of the cantilever finger is reduced from the larger dimension shown at 142 in FIG. 6 to the smaller dimension 144 shown in FIG. 7. The biasing portion provided by cantilever finger 122 has a first relaxed position prior to insertion of friction disc 110 onto hub 102, and a second deflected position engaging hub 102 upon insertion of friction disc 110 onto hub 102. Cantilever finger 122 is deflected further into cavity 120 in the deflected position than in the relaxed position. Deflection of cantilever finger 122 into cavity 120 flexively applies the noted bias against hub 102 by self-bias of deflection of the biasing portion provided by cantilever finger 122. Projected fingertip 138 engaging hub 102 spaces at least a portion 146, FIG. 10, of the cantilever finger away from the hub, as shown at gap 148.

Friction disc 102 is inserted axially, as shown as arrow 150 in FIGS. 5 and 6, onto hub 102 along a direction parallel to axis of rotation 104 of electric motor shaft 1. Hub 102 has first and second distally opposite side surfaces 152 and 154 facing in opposite axial directions, one or both of which are beveled along a tapered entrance ramp 156 and 158, respectively, relative to axis 104 to guide and ease insertion of friction disc 110 onto hub 102, particularly cantilever finger 122 at fingertip 138. Alternatively, fingertip 138 may be beveled along tapered entrance ramps on its distally opposite side surfaces facing in opposite axial directions, to guide and ease insertion of the. friction disc onto the hub.

Cantilever finger 122 has a first thickness 160 at root end 124 along a first radial direction relative to axis of rotation 104 of shaft 1. The cantilever finger has a second thickness 162 at free end 126 along a second radial direction. First thickness 160 is greater than second thickness 162. Cantilever finger 122 has an outer circumferential surface 164 facing radially outwardly towards cavity 120, and an inner circumferential surface 166 facing radially inwardly toward hub 102. Cavity 120 extends circumferentially from a root-cavity end 168 to a free-cavity end 170. Cavity 120 has a first clearance gap 172 at root-cavity end 168 having a width along a first radial direction relative to axis of rotation 104 of shaft 1. Cavity 120 has a second clearance gap 174 at free-cavity end 170 having a width along a second radial direction. In the pre-inserted condition of friction disc 110, FIGS. 6 and 8, i.e. the non-defected position of cantilever finger 122, the radial width of clearance gap 172 is less than the radial width of clearance gap 174. When friction disc 110 is inserted onto hub 102, FIG. 7, i.e. the deflected position of cantilever finger 122, it is also preferred that the width of clearance gap 172 is less than the width of clearance gap 174, though the latter does allow tolerance, and in some applications, the cantilever finger 122 may be deflected to a position wherein gap 174 is the same as or less than gap 172. Cavity 120 has inner and outer circumferential surfaces 164 and 176, respectively, FIG. 10, facing each other across the cavity. Inner circumferential surface 164 is formed by the noted outer circumferential surface of cantilever finger 122. Inner circumferential surface 166 of cantilever finger 122 and outer circumferential surface 176 of cavity 120 are substantially parallel in the relaxed, non-deflected position of the cantilever finger, FIG. 8. The inner and outer circumferential surfaces 164 and 176 of cavity 120 are non-parallel to each other.

FIGS. 11–17 illustrate a second embodiment of the present invention for a brake mechanism selectively stopping and permitting rotation of electric motor shaft 201. Hub 102 of FIGS. 5–10 is provided by a hubbed configuration 202 integrally formed on shaft 201, eliminating the need for a separate hub member. Friction disc 204 is mounted on hub 202 in keyed relation for rotation therewith and is engageable with pressure plate 30 for stopping rotation of friction disc 204, to stop rotation of hub 202 and shaft 201. Friction disc 204 has an inner circumference 206, FIG. 12 with engagement surfaces engaging the motor shaft hub and including a biasing portion 208 integrally molded therewith and engaging the hub and applying a radial bias along a biasing direction transverse to the axis of rotation 210 of the motor shaft and which urges engagement of the hub and friction disc to minimize rattling of the friction disc during rotation of the motor shaft.

The noted hubbed configuration is provided by a pair of oppositely facing flat surfaces 212 and 214 formed by a machining operation on the end of the motor shaft. This type of machining operation is not cost prohibitive, and hence is acceptable to manufacturers. Hub 102 in FIGS. 5–10 may also be provided by a hubbed configuration integrally formed on motor shaft 1, eg a hexagonal shape, to. eliminate the need for a separate member. However, the type of machining operation needed for the latter embodiment is costly, and hence may be objectionable to manufacturers, and thus a separate hub member in the embodiment of FIGS. 5–10 is preferred.

Inner circumference 206, FIG. 12, of friction disc 20 has a slotted configuration through which flat surfaces 212 and 214 of the motor shaft hub extend in mating keyed relation, FIGS. 13 and 14. The slotted configuration of inner circumference 206 of friction disc 204 has a pair of elongated surfaces 216 and 218 facing each other across a gap 220 through which flat surfaces 212 and 214 of the motor shaft hub extend. The noted biasing portion is provided by a bump 208 on elongated surface 216 engaging flat surface 214 of motor shaft 202. Friction disc 204 is an integral molded member preferably of thermoplastic material, such as polyphenyline sulfide or polycarbonate, which material is slightly compressively resilient, such that biasing portion bump 208 compressively applies the noted bias.

Elongated surfaces 216 and 218 are spanned at their ends by a pair of end surfaces 222 and 224 shorter than elongated surfaces 216 and 218, such that the noted slotted configuration of inner circumference 206 of friction disc 204 has a generally rectangular shape defined by distally opposite elongated surfaces 216 and 218 spaced by distally opposite shorter end surfaces 222 and 224. Bump 208 of elongated surface 216 engages flat surface 214 of the motor shaft hub, and the remainder of elongated surface 216 is spaced from flat surface 214 by a clearance gap 226, FIG. 13. on each side of bump 208. Elongated surface 218 of the friction disc is flush against and engages flat surface 212 of the motor shaft hub without a clearance gap.

End surfaces 222 and 224 of the inner circumference 206 of friction disc 204 have convex portions 228 and 230 bowed inwardly towards each other and having nominal clearance, FIG. 13, to motor shaft hub 202, which nominal clearance may be as low as zero. The ends of the noted end surfaces 222 and 224 meet elongated surfaces 216 and 218 at respective corners such as 232 of the noted rectangular shape. Such corners are spaced from motor shaft hub 202 by a clearance gap 234, FIG. 13, on each side of the respective central convex portion such as 230. Clearance gap 234 is greater than clearance gap 226. It has been found that clearance gap 234 facilitates the molding operation forming the friction disc, including drawing thereof. The tolerance between motor shaft 202 and convex portions 228 and 230 of the inner circumference of the friction disc are chosen to provide as snug a fit as possible but not impeding or otherwise causing too great of a friction fit as disc 204 is slid onto hub 202.

Convex portions 228 and 230 do not materially contribute to the biased engagement of friction disc 204 and hub 202. Such bias is provided by bump 208. Convex portions 228 and 230 may or may not touch hub 202. The dominant component of rattling noise during rotation of the motor shaft is due to wobble or flutter of friction disc 204, for example against pressure plate 30 as shown in phantom line in FIGS. 16 and 17. To combat this noise, biasing portion 208 provides a radial bias along a biasing direction transverse to axis of rotation 210 of motor shaft 201 to urge flush engagement of flat surface 212 of motor shaft hub 202 against elongated flat surface 218 of inner circumference 206 of friction disc 204. The larger this flush flat engagement surface, the less wobble. Any biased engagement provided by convex surfaces 228 and 230 has less anti-wobble effect because of their smaller surface area, and hence tolerances to the latter surfaces are instead chosen to facilitate ease of insertion of friction disc 204 onto motor shaft hub 202. The end of the motor shaft hub has beveled entrance ramp surfaces 236 and 238, FIG. 14, transitioning to respective flat surfaces 212 and 214, to further facilitate and guide insertion of friction disc 204 thereon.

During continuing development of the noted second embodiment, it was found that tolerance deviations between the motor shaft hub and the friction disc at the opposite ranges of their respective tolerance windows may cause an undesirably tight friction fit interference making it difficult to slide friction disc 204 onto motor shaft hub 202, FIG. 11. For example, the manufacturing tolerance in molding the friction disc and forming the slotted configuration of inner circumference 206 is about 0.004 inch. The manufacturing tolerance in machining flat surfaces 212 and 214 on motor shaft 201 is also about 0.004 inch. If the tolerance deviation of bump 208 on inner circumference 206 of the friction disc is at its highest point toward the motor shaft, and if the tolerance deviation of flat surface 214 of the motor shaft hub is at its lowest point toward bump 208, then there is an increase in the amount of bias applied by bump 208 against the motor shaft hub, however, there is also an increase in the friction fit interference in attempting to axially slide friction disc 204 onto motor shaft hub 202. Conversely, if the tolerance deviation of bump 208 is at its low point of the noted tolerance deviation window, and if flat surface 214 of the motor shaft hub is at its high point, there may be clearance between bump 208 and surface 214, as shown at nominal clearance 240 in FIG. 18. In such version, there is no longer a compression bias applied by bump 208 against the motor hub, however there is not the noted undue friction resistance when sliding friction discs 204 onto motor shaft hub 202. It has been found, nonetheless, that the version in FIG. 18, including nominal clearance gap 240, still significantly minimizes rattling and wobbling noise of the friction disc during rotation of the motor shaft. It is believed that this observed reduction of noise is due to the noted flush flat engagement of surfaces 212 and 218, as noted above, in combination with the centrifugal force fly wheel effect of the heavier friction disc 204 having only a small slotted cut-out central portion at 220 as compared to previous friction discs with large central cut-out portions, and in combination with the limited amount of travel of friction disc 204 through the nominal clearance of gap 240, which reduced travel and vibration through reduced clearance gap 240 reduces rattle noise otherwise caused by travel and vibration of the friction disc through a larger travel gap or clearance. It is preferred that nominal clearance 240 be kept as low as possible, preferably as low as 0.001 inch. It is recognized that various equivalents, alternatives and modifications are possible within the scope of the appended claims. The invention has been illustrated in conjunction with an armature actuated brake, AAB. The invention is also applicable to a solenoid actuated brake, SAB, as well as other electric motor brakes.

What is claimed is:

1. A brake mechanism adapted for selectively stopping and permitting rotation of an electric motor shaft, said shaft having a hub rotating therewith about the axis of said shaft, a friction disc mounted on said hub in keyed relation for rotation therewith and engageable with a pressure plate for stopping rotation of said friction disc, to stop rotation of said hub and shaft, wherein said friction disc has an inner circumference with at least one engagement surface engaging said hub, wherein said friction disc includes an anti-rattle portion integrally molded therewith and reducing the tolerance gap between said hub and said friction disc to minimize rattling of said friction disc during rotation of said shaft, wherein said anti-rattle portion reduces said tolerance gap to zero.

2. The invention according to claim 1 wherein said anti-rattle portion comprises a biasing portion integrally molded with said friction disc and engaging said hub and applying a bias which urges engagement of said hub and said friction disc to minimize rattling of said friction disc during rotation of said shaft.

3. The invention according to claim 2 wherein said biasing portion applies a radial bias along a biasing direction transverse to said axis of rotation of said shaft.

4. The invention according to claim 2 wherein said biasing portion flexively applies said bias.

5. The invention according to claim 2 wherein said biasing portion compressively applies said bias.

6. A brake mechanism adapted for selectively stopping and permitting rotation of an electric motor shaft, said shaft having a hub rotating therewith about the axis of said shaft, a friction disc mounted on said hub in keyed relation for rotation therewith and engageable with a pressure plate for stopping rotation of said friction disc, to stop rotation of said hub and shaft, wherein said friction disc has an inner circumference with at least one engagement surface engaging said hub, wherein said friction disc includes an anti-rattle portion integrally molded therewith and reducing the tolerance gap between said hub and said friction disc to minimize rattling of said friction disc during rotation of said shaft, wherein said friction disc has a cavity at said inner circumference facing said hub, and said anti-rattle portion comprises a biasing portion integrally molded with said friction disc and engaging said hub and applying a bias which urges engagement of said hub and said friction disc to minimize rattling of said friction disc during rotation of said shaft, wherein said biasing portion extends into said cavity and engages said hub and provides said bias.

7. The invention according to claim 6 wherein said biasing portion has a first relaxed position prior to insertion of said friction disc onto said hub, and a second deflected position engaging said hub upon insertion of said friction disc onto said hub, wherein said biasing portion is deflected further into said cavity in said deflected position than in said relaxed position, said deflection of said biasing portion into said cavity applying said bias against said hub by self-bias of deflection of said biasing portion.

8. A brake mechanism adapted for selectively stopping and permitting rotation of an electric motor shaft, said shaft having a hub rotating therewith about the axis of said shaft, a friction disc mounted on said hub in keyed relation for rotation therewith and engageable with a pressure plate for stopping rotation of said friction disc, to stop rotation of said hub and shaft, wherein said friction disc has an inner circumference with at least one engagement surface engaging said hub, wherein said friction disc includes an anti-rattle portion integrally molded therewith and reducing the tolerance gap between said hub and said friction disc to minimize rattling of said friction disc during rotation of said shaft, wherein said anti-rattle portion comprises a biasing portion integrally molded with said friction disc and applying a bias which urges engagement of said hub and said friction disc to minimize rattling of said friction disc during rotation of said shaft, and wherein said biasing portion comprises a compression bump integrally formed on said inner circumference of said friction disc.

9. A brake mechanism adapted for selectively stopping and permitting rotation of an electric motor shaft, said shaft having a hub rotating therewith about the axis of said shaft, a friction disc mounted on said hub in keyed relation for rotation therewith and engageable with a pressure plate for stopping rotation of said friction disc, to stop rotation of said hub and shaft, wherein said friction disc has an inner circumference with at least one engagement surface engaging said hub, wherein said friction disc includes an anti-rattle portion integrally molded therewith and reducing the tolerance gap between said hub and said friction disc to minimize rattling of said friction disc during rotation of said shaft, wherein said anti-rattle portion comprises an anti-rattle bump integrally formed on said inner circumference of said friction disc, wherein the tolerance gap between said anti-rattle bump and said hub is zero.

10. A brake mechanism adapted for selectively stopping and permitting rotation of an electric motor shaft, said shaft having a hub rotating therewith about the axis of said shaft, said hub having an outer circumference with a first surface, a friction disc mounted on said hub in keyed relation for rotation therewith and engageable with a pressure plate for stopping rotation of said friction disc, to stop rotation of said hub and shaft, said friction disc having an inner circumference with a second surface, said second surface having an anti-rattle portion integrally formed therewith and reducing the tolerance gap between said first and second surfaces to minimize rattling of said friction disc during rotation of said shaft and eliminating the need for a separate anti-rattle spring, wherein said anti-rattle portion reduces said tolerance gap to zero.

11. The invention according to claim 10 wherein said anti-rattle portion comprises a biasing portion integrally formed with said friction disc on said second surface and engaging said first surface and applying a bias which urges engagement of said hub and said friction disc to minimize rattling of said friction disc during rotation of said shaft.

12. A brake mechanism adapted for selectively stopping and permitting rotation of an electric motor shaft, said shaft having a hub rotating therewith about the axis of said shaft, said hub having an outer circumference with a first surface, a friction disc mounted on said hub in keyed relation for rotation therewith and engageable with a pressure plate for stopping rotation of said friction disc, to stop rotation of said hub and shaft, said friction disc having an inner circumference with a second surface, said second surface having an anti-rattle portion integrally formed therewith and reducing the tolerance gap between said first and second surfaces to minimize rattling of said friction disc during rotation of said shaft and eliminating the need for a separate anti-rattle spring, wherein said first and second surfaces face each other across a clearance gap, and wherein said anti-rattle portion comprises a bump integrally formed on said second surface and extending into said gap toward said first surface, and said bump engages said first surface.

13. A brake mechanism adapted for selectively stopping and permitting rotation of an electric motor shaft, said shaft having a hub rotating therewith about the axis of said shaft, said hub having an outer circumference with a first surface, a friction disc mounted on said hub in keyed relation for rotation therewith and engageable with a pressure plate for stopping rotation of said friction disc, to stop rotation of said hub and shaft, said friction disc having an inner circumference with a second surface, said second surface having an anti-rattle portion integrally formed therewith and reducing the tolerance gap between said first and second surfaces to minimize rattling of said friction disc during rotation of said shaft and eliminating the need for a separate anti-rattle spring, wherein said hub has a pair of oppositely facing flat surfaces comprising said first surface and a third surface, said inner circumference of said friction disc has a slotted configuration having a pair of oppositely facing flat surfaces comprising said second surface and a fourth surface, wherein said flat surfaces of said hub extend through said slotted configuration of said inner circumference of said friction disc in mating keyed relation such that said fourth surface engages said third surface, and wherein said anti-rattle portion comprises a bump integrally formed on said second surface and extending toward said first surface.

14. The invention according to claim 13 wherein said fourth surface is flush against and engages said third surface without a clearance gap.

15. The invention according to claim 13 wherein said second and fourth surfaces of said inner circumference of said friction disc are spanned at their ends by a pair of end surfaces, said end surfaces having convex portions bowed inwardly towards each other and having nominal clearance to said hub.

16. The invention according to claim 15 wherein said end surfaces meet said second and fourth surfaces at respective corners, said corners being spaced from said hub by a second clearance gap on each side of said respective convex portion, said second clearance gap being greater than said first mentioned clearance gap.

17. A brake mechanism adapted for selectively stopping and permitting rotation of an electric motor shaft, said shaft having a hub rotating therewith about the axis of said shaft, a friction disc mounted on said hub in keyed relation for rotation therewith and engageable with a pressure plate for stopping rotation of said friction disc, to stop rotation of said hub and shaft, wherein said friction disc has an inner circumference with at least one engagement surface engaging said hub, wherein said friction disc includes an anti-rattle portion integrally molded therewith and reducing the tolerance gap between said hub and said friction disc to minimize rattling of said friction disc during rotation of said shaft, wherein said friction disc has a cavity at said inner circumference facing said hub, and said anti-rattle portion comprises a cantilever finger extending into said cavity and engaging said hub and providing a cantilever bias along a biasing direction transverse to said axis of rotation of said shaft and which urges engagement of said hub and said friction disc to minimize rattling of said friction disc during rotation of said shaft.

18. The invention according to claim 17 wherein said cantilever finger extends from a root end along a generally circumferential direction of said inner circumference to a free end.

19. The invention according to claim 18 wherein said cantilever finger has an intermediate section between said root end and said free end, said intermediate section being tangent to an arc having a center at said axis of rotation of said shaft.

20. The invention according to claim 19 wherein said inner circumference of said friction disc has a plurality of flat engagement surfaces, and wherein said intermediate section of said cantilever finger is a flat surface.

21. The invention according to claim 20 wherein said hub has a plurality of flat surfaces.

22. The invention according to claim 18 wherein said free end of said cantilever finger has a projected fingertip projecting inwardly toward and engaging said hub to deflect said cantilever finger away from said hub, increasing and focusing application of said bias at said projected fingertip, to further minimize said rattling.

23. The invention according to claim 22 wherein said projected fingertip engaging said hub spaces at least a portion of the remainder of said cantilever finger away from said hub.

24. The invention according to claim 22 wherein said friction disc is inserted axially onto said hub along a direction parallel to said axis of rotation of said shaft, and wherein said hub and said projected fingertip each have first and second distally opposite side surfaces facing in opposite axial directions, and wherein at least one of said side surfaces is beveled along a tapered entrance ramp relative to said axis to guide and ease said insertion of said friction disc onto said hub.

25. The invention according to claim 19 wherein said cavity has inner and outer circumferential surfaces facing each other across said cavity and forming a clearance gap therebetween, wherein said cantilever finger has a first relaxed position prior to insertion of said friction disc onto said hub, and a second deflected position engaging said hub upon insertion of said friction disc onto said hub, and wherein the width of said clearance gap in said first position of said cantilever finger is greater than the width of said clearance gap in said second position of said cantilever finger.

26. The invention according to claim 25 wherein said cantilever finger has an outer circumferential surface facing said cavity and providing said inner circumferential surface of said cavity, and wherein said cantilever finger has an inner circumferential facing said hub.

27. The invention according to claim 18 wherein said cantilever finger has a first thickness at said root end along a first radial direction relative to said axis of rotation of said shaft, and a second thickness at said free end along a second radial direction, and wherein said first thickness is greater than said second thickness.

28. The invention according to claim 18 wherein said cantilever finger has an outer circumferential surface facing said cavity, and an inner circumferential surface facing said hub, and wherein said cavity extends circumferentially from a root-cavity end to a free-cavity end, and wherein said cavity has a first clearance gap at said root-cavity end having a width along a first radial direction relative to said axis of rotation of said shaft, and a second clearance gap at said free-cavity end having a width along a second radial direction, and wherein said width of said first clearance gap is less than said width of said second clearance gap.

29. The invention according to claim 28 wherein said cantilever finger has a first thickness at said root end along said first radial direction, and a second thickness at said free end along said second radial direction, and wherein said first thickness is greater than said second thickness.

30. The invention according to claim 29 wherein said cavity has inner and outer circumferential surfaces facing each other across said cavity, and wherein said inner circumferential surface of said cavity is formed by said outer circumferential surface of said cantilever finger.

31. The invention according to claim 30 wherein said inner circumferential surface of said cantilever finger and said outer circumferential surface of said cavity are parallel.

32. The invention according to claim 31 wherein said inner and outer circumferential surfaces of said cavity are non-parallel to each other.

33. The invention according to claim 31 wherein said inner and outer circumferential surfaces of said cantilever finger are non-parallel to each other.

34. The invention according to claim 17 wherein said friction disc is a one-piece unitary integrally molded member including said cantilever finger, eliminating the need for a separate anti-rattle spring.

35. The invention according to claim 17 wherein said hub is a separate hub member secured on said shaft.

* * * * *